US012586604B2

(12) United States Patent
Ee et al.

(10) Patent No.: US 12,586,604 B2
(45) Date of Patent: Mar. 24, 2026

(54) GIMBAL DESIGN FOR HARD DISK DRIVE DEVICE

(71) Applicant: Magnecomp Corporation, Murrieta, CA (US)

(72) Inventors: Kuen Chee Ee, Chino, CA (US); Long Zhang, Winchester, CA (US); David Glaess, Bangkok (TH); Treesoon Kotchaplayuk, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/671,094

(22) Filed: May 22, 2024

(65) Prior Publication Data

US 2024/0395284 A1     Nov. 28, 2024

Related U.S. Application Data

(60) Provisional application No. 63/469,321, filed on May 26, 2023.

(51) Int. Cl.
G11B 5/48     (2006.01)

(52) U.S. Cl.
CPC ............ G11B 5/483 (2015.09); G11B 5/4873 (2013.01)

(58) Field of Classification Search
CPC ....... G11B 5/483; G11B 5/596; G11B 5/4873; G11B 5/5552; G11B 21/21; G11B 5/4826
See application file for complete search history.

(56) References Cited

U.S. PATENT DOCUMENTS

| | | | |
|---|---|---|---|
| 5,282,103 | A | 1/1994 | Hatch et al. |
| 5,333,085 | A | 7/1994 | Prentice et al. |
| 5,530,606 | A | 6/1996 | Baasch et al. |
| 5,771,136 | A | 6/1998 | Girard |
| 5,838,517 | A | 11/1998 | Frater et al. |
| 5,892,637 | A | 4/1999 | Brooks, Jr. et al. |

(Continued)

FOREIGN PATENT DOCUMENTS

| | | |
|---|---|---|
| CN | 1828726 A | 9/2006 |
| EP | 1 638 086 A2 | 3/2006 |

(Continued)

OTHER PUBLICATIONS

International Search Report and Written Opinion in International Application No. PCT/US2024/030892, mailed Aug. 30, 2024.

(Continued)

*Primary Examiner* — Daniell L Negron
*Assistant Examiner* — Michelle J. Kim
(74) *Attorney, Agent, or Firm* — DLA Piper LLP (US)

(57) ABSTRACT

A head gimbal assembly includes a gimbal having a base portion and a tongue that are joined together by a neck portion, a circuit mounted on the gimbal, a slider mounted on the tongue and electrically connected to the circuit, a first PZT actuator having a proximal end mounted on a first bonding site of the circuit and a distal end mounted on a second bonding site of the circuit, and a second PZT actuator having a proximal end mounted on a third bonding site of the circuit and a distal end mounted on a fourth bonding site of the circuit. The first and third bonding sites do not overlap with and are not directly supported by the base portion. The second and fourth bonding sites overlap with and are directly supported by the tongue.

12 Claims, 6 Drawing Sheets

(56) References Cited

U.S. PATENT DOCUMENTS

| | | | |
|---|---|---|---|
| 5,959,807 A | 9/1999 | Jurgenson | |
| 6,163,438 A | 12/2000 | Kajitani | |
| 6,172,853 B1 | 1/2001 | Davis et al. | |
| 6,195,237 B1 | 2/2001 | Perez | |
| 6,233,121 B1 | 5/2001 | Pan | |
| 6,320,729 B1 | 11/2001 | Coon | |
| 6,424,498 B1 | 7/2002 | Patterson et al. | |
| 6,445,546 B1 | 9/2002 | Coon | |
| 6,483,670 B1 | 11/2002 | Watanabe | |
| 6,538,850 B1 | 3/2003 | Hadian et al. | |
| 6,556,383 B2 | 4/2003 | Murphy et al. | |
| 6,611,402 B1 | 8/2003 | Mangold | |
| 6,747,849 B1 | 6/2004 | Le et al. | |
| 6,757,137 B1 | 6/2004 | Mei | |
| 6,801,400 B2 | 10/2004 | Fu et al. | |
| 6,885,523 B1 | 4/2005 | Summers et al. | |
| 6,967,821 B2 | 11/2005 | Himes et al. | |
| 6,995,953 B2 | 2/2006 | Mahoney et al. | |
| 7,006,333 B1 | 2/2006 | Summers | |
| 7,010,847 B1 | 3/2006 | Hadian et al. | |
| 7,085,104 B1 | 8/2006 | Hadian et al. | |
| 7,307,817 B1 | 12/2007 | Mei | |
| 7,551,401 B1 | 6/2009 | Ciurea et al. | |
| 7,719,797 B1 | 5/2010 | Mei | |
| 7,751,149 B1 | 7/2010 | Mei | |
| 7,852,604 B2 | 12/2010 | Sassine | |
| 8,107,198 B1 | 1/2012 | Ee | |
| 8,116,039 B2 | 2/2012 | Takikawa | |
| 8,351,159 B2 | 1/2013 | Hirano et al. | |
| 8,446,695 B1 | 5/2013 | Ee et al. | |
| 8,675,314 B1 | 3/2014 | Bjorstrom et al. | |
| 8,837,090 B2 | 9/2014 | Greminger et al. | |
| 9,025,282 B1 | 5/2015 | Miller | |
| 9,064,510 B1* | 6/2015 | Kikuchi | G11B 5/39 |
| 9,214,176 B1 | 12/2015 | Sharma et al. | |
| 9,330,698 B1* | 5/2016 | Hahn | G11B 5/4806 |
| 10,276,195 B2 | 4/2019 | Ee et al. | |
| 10,566,016 B2 | 2/2020 | Yamada et al. | |
| 11,043,236 B1 | 6/2021 | Pallay | |
| 11,176,961 B2 | 11/2021 | Suzuki et al. | |
| 11,410,693 B2 | 8/2022 | Ee et al. | |
| 11,495,731 B2* | 11/2022 | Zhang | H10N 30/872 |
| 11,900,972 B2 | 2/2024 | Ee et al. | |
| 11,915,732 B1 | 2/2024 | Ee | |
| 2001/0012182 A1 | 8/2001 | Boutaghou et al. | |
| 2003/0137774 A1 | 7/2003 | Fu et al. | |
| 2003/0202284 A1 | 10/2003 | Arya | |
| 2004/0032695 A1 | 2/2004 | Sassine et al. | |
| 2004/0070883 A1 | 4/2004 | Mahoney et al. | |
| 2005/0028353 A1 | 2/2005 | Kidachi et al. | |
| 2005/0180052 A1 | 8/2005 | Suzuki et al. | |
| 2006/0034017 A1 | 2/2006 | Agari et al. | |
| 2006/0092571 A1 | 5/2006 | Kang | |
| 2006/0171080 A1 | 8/2006 | Yamaguchi | |
| 2006/0209466 A1 | 9/2006 | Ono et al. | |
| 2006/0274452 A1 | 12/2006 | Arya | |
| 2006/0274453 A1 | 12/2006 | Arya | |
| 2007/0070552 A1 | 3/2007 | Yao et al. | |
| 2007/0247760 A1 | 10/2007 | Hanya et al. | |
| 2007/0253115 A1 | 11/2007 | Yao et al. | |
| 2009/0195938 A1 | 8/2009 | Yao et al. | |
| 2009/0244786 A1 | 10/2009 | Hatch | |
| 2010/0079915 A1 | 4/2010 | Kido | |
| 2010/0315744 A1 | 12/2010 | Virmani et al. | |
| 2010/0315745 A1 | 12/2010 | Virmani et al. | |
| 2011/0085270 A1 | 4/2011 | Hirano et al. | |
| 2012/0287536 A1 | 11/2012 | Kuwajima | |
| 2014/0085754 A1 | 3/2014 | Hanya et al. | |
| 2014/0085755 A1 | 3/2014 | Hanya et al. | |
| 2014/0098440 A1 | 4/2014 | Miller et al. | |
| 2014/0362476 A1 | 12/2014 | Miller et al. | |
| 2015/0062758 A1 | 3/2015 | Miller et al. | |
| 2017/0162218 A1 | 6/2017 | Miller et al. | |
| 2017/0316796 A1 | 11/2017 | Kumar et al. | |
| 2017/0330589 A1 | 11/2017 | Bjorstrom et al. | |
| 2018/0005653 A1 | 1/2018 | Pokornowski et al. | |
| 2018/0182418 A1* | 6/2018 | Ee | G11B 5/5552 |
| 2018/0294006 A1 | 10/2018 | Miller et al. | |
| 2019/0066720 A1* | 2/2019 | Yamada | G11B 5/4833 |
| 2019/0362745 A1* | 11/2019 | Pokornowski | G11B 5/596 |
| 2020/0091404 A1* | 3/2020 | Zhang | H10N 30/2042 |
| 2021/0012795 A1* | 1/2021 | Zhang | H10N 30/50 |
| 2021/0151073 A1 | 5/2021 | Yamada | |
| 2021/0280209 A1 | 9/2021 | Suzuki et al. | |
| 2022/0157337 A1 | 5/2022 | Aoki | |
| 2024/0161774 A1 | 5/2024 | Ee et al. | |

FOREIGN PATENT DOCUMENTS

| | | | |
|---|---|---|---|
| EP | 2 105 918 A1 | 9/2009 | |
| JP | 2004-326891 A | 11/2004 | |
| JP | 2010-86630 A | 4/2010 | |
| JP | 2014-67474 A | 4/2014 | |
| WO | 2014/190001 A1 | 11/2014 | |
| WO | 2015/027034 A2 | 2/2015 | |

OTHER PUBLICATIONS

International Search Report and Written Opinion in International Application No. PCT/US2021/036642, mailed Sep. 22, 2021.

International Preliminary Report on Patentability in International Application No. PCT/US2021/036642, mailed Dec. 22, 2022.

Office Action in U.S. Appl. No. 17/342,297, dated Dec. 20, 2021.

Office Action in U.S. Appl. No. 17/342,297, dated Jun. 10, 2022.

Office Action in U.S. Appl. No. 17/342,297, dated Aug. 24, 2022.

Office Action in U.S. Appl. No. 17/342,297, dated Feb. 15, 2023.

Office Action in U.S. Appl. No. 17/342,297, dated Jun. 1, 2023.

Notice of Allowance in U.S. Appl. No. 17/342,297, dated Oct. 13, 2023.

Notice of Allowance in U.S. Appl. No. 18/212,586, dated Oct. 24, 2023.

Notification of Reasons for Rejection in Japanese Patent Application No. 2022-575922, dated Jul. 8, 2025.

Office Action in U.S. Appl. No. 18/421,150, dated Apr. 18, 2025.

Office Action in U.S. Appl. No. 18/421,150, dated Jul. 16, 2025.

* cited by examiner

GIMBAL DESIGN FOR HARD DISK DRIVE DEVICE

CROSS-REFERENCE TO RELATED APPLICATIONS

This application claims the benefit of, and priority to, U.S. Provisional Application No. 63/469,321 filed on May 26, 2023, which is hereby incorporated by reference in its entirety.

FIELD OF THE INVENTION

The present disclosure relates to hard disk drives, and more particularly to a gimbal design as part of a suspension assembly for hard disk drives.

BACKGROUND OF THE INVENTION

A hard disk drive (HDD) is a non-volatile storage device that stores digitally encoded data on one or more circular disks having magnetic surfaces. In operation, each disk spins rapidly. Data is read from and written to the disk using a read-write head that is positioned over a specific data track or location on the disk surface by a suspension assembly, which in turn is attached to the arm of the head stack assembly, which is rotated by a voice coil motor or actuator integral to the head stack assembly. Keeping the read-write head stable, and aligned with a targeted data track upon the disk surface defines the primary function of the suspension assembly during hard disk drive operation. Optimized suspension assembly design and manufacture can minimize the effects of mechanical, thermal, and other off-track disturbances which can degrade the performance of the hard disk drive. The suspension assembly includes a load beam. In operation, the actuator positions the distal end of the load beam over the desired portion of the disk (e.g., one of the circular tracks on the disk surface). A gimbal assembly (also referred to as a flexure) is mounted on the distal end of the load beam. The gimbal assembly includes components such as a slider containing the read-write head and microactuator devices (piezoelectric devices, will be named PZT from here onward) that rotate a portion of the gimbal assembly for fine positioning of the slider (as opposed to more coarse positioning of the slider by the actuator). The pressure caused by air viscosity between the slider and the spinning disk causes the slider to hover over (in close proximity to) the surface of the disk. While the load beam is relatively stirr, particularly in the lateral axis, the gimbal assembly is more flexible so that the slider can pitch and roll as it floats over the disk surface in order to maintain its operational distance immediately over the disk surface.

FIG. 1 illustrates a portion of a conventional head stack assembly 1, while FIGS. 2-3 illustrate a conventional head gimbal assembly 10 of the head stack assembly 2. The head stack assembly 2 includes a suspension assembly 3 with a load beam 4 terminating at a proximal end with a hinge 6 that is connected to a baseplate 8. A head gimbal assembly 10 is mounted on the distal end of the load beam 4. The baseplate 8 is connected to an actuator arm 12 of the head stack assembly 2, which is rotated by an integral actuator (not shown).

As best shown in FIGS. 2 and 3, head gimbal assembly 10 comprises a gimbal 14 of thin components of sheet metal (e.g., stainless steel), a circuit 16 that includes conductive traces (e.g., copper) and insulation material (e.g., polyimide), a slider 18 with the read/write head mounted on the gimbal 14 (e.g., by adhesive), and PZT actuators 22 mounted on the same side of the gimbal 14 as the slider 18. Circuit 16 extends along the load beam 4 and head gimbal assembly 10 for electrical signal communication to the read/write head of the slider 18 and to PZT actuators 22. The conductive traces of the circuit 16 are electrically insulated from the gimbal 14 by the insulation material of the circuit 16.

The gimbal 14 includes a base portion 14a and a tongue 14b, which are connected to each other by a neck portion 14c. The tongue 14b is configured to rotate about the neck portion 14c (for fine position control of the slider 18). The slider 18 is mounted on the tongue 14b. The PZT actuators 22 are mounted between the tongue 14b and the base portion 14a, for rotating the tongue 14b about the neck portion 14c when the PZT actuators 22 expand and contract in response to electrical signals provided by the circuit 16, which provides fine movement control of the slider 18 relative to the disk tracks during operation. In this example, the PZT actuators 22 are indirectly mounted on the gimbal 14, meaning that the PZT actuators 22 are mounted on the circuit 16, which is in turn mounted on the gimbal 14. Conventional thinking calls for the base portion 14a to be rigid and the tongue 14b to be more flexible, for better stroke performance. This is achieved by having the base portion 14a disposed fully under and fully supporting the bonding sites 16a of the circuit 16 to which the PZT actuators 22 are mounted, and the tongue 14b disposed only partially under and only partially supporting the bonding sites 16b of the circuit 16 to which the PZT actuators 22 are mounted.

PZT actuators 22 can be multi-layer devices of piezoelectric material. A commonly used example of piezoelectric material can be lead zirconate titanate, although other piezoelectric materials are also used and known, which expand and contract in response to electronic signals. FIG. 4 shows a cross-section of a conventional PZT actuator 22, with three layers 24, 26, 28 of piezoelectric material, although more or fewer layers can be used. PZT actuator 22 can include a first electrode 30 disposed on at least a portion of the bottom surface of the first PZT layer 24. A second electrode 32 can be disposed between at least a portion of the first PZT layer 24 and the second PZT layer 26. A third electrode 24 can be disposed between at least a portion of the second PZT layer 26 and the third PZT layer 28. Finally, a fourth electrode 36 can be disposed on at least a portion of the top surface of the third PZT layer 28. The shared lengths (i.e., overlap) of the first electrode 30 and the second electrode 32 can define the effective electrode length 38 and thus an active piezoelectric layer length of PZT layer 24. Furthermore, the shared lengths (i.e., overlap) of the third electrode 34 and the fourth electrode 36 can define the effective electrode length 40 and thus an active piezoelectric layer length of PZT layer 28. Conventional thinking calls for maximizing effective electrode lengths and active piezoelectric layer lengths 38 and 40 to maximize the expansion/contraction performance of the PZT actuator 22 in response to given electrical signals. However, it is also known to have the length L1 of the top electrode (i.e., the fourth electrode 36 in this example) be shorter than the lengths L2 of the other electrodes 30, 32, 34 for higher stroke sensitivity, even though the effective electrode length 40 is reduced, as shown in FIG. 4.

It has been discovered by the present inventors, however, that using the PZT actuator 22 of FIG. 4, with the reduced length top electrode 36, together with the head gimbal assembly of FIGS. 2-3, results in low frequency modes that have more variations for different z-heights. Specifically, FIG. 5 is a graphical representation of a resonant frequency (FRF) of the suspension assembly 3 with the multi-layer PZT 22 mounted on the gimbal 14 as shown in FIGS. 2-3. The resonant frequency (FRF) has low frequency modes around frequencies of 9000 Hz and 14000 Hz with more variations for different z-heights.

There is a need for a gimbal design that is more compatible with PZT actuators with reduced length top electrodes, that better balances stroke sensitivity and resonant frequency performance.

BRIEF SUMMARY OF THE INVENTION

The aforementioned problems and needs are addressed by a head gimbal assembly that includes a gimbal having a base portion and a tongue that are joined together by a neck portion, a circuit mounted on the gimbal; a slider mounted on the tongue, and electrically connected to the circuit, a first PZT actuator having a proximal end mounted on a first bonding site of the circuit and a distal end mounted on a second bonding site of the circuit, and a second PZT actuator having a proximal end mounted on a third bonding site of the circuit and a distal end mounted on a fourth bonding site of the circuit. The first and third bonding sites do not overlap with and are not directly supported by the base portion. The second and fourth bonding sites overlap with and are directly supported by the tongue.

A suspension assembly includes a baseplate, a load beam connected to the baseplate by a hinge, a gimbal mounted to the load beam, wherein the gimbal comprises a base portion and a tongue that are joined together by a neck portion, a circuit mounted on the gimbal, a slider mounted on the tongue, and electrically connected to the circuit, a first PZT actuator having a proximal end mounted on a first bonding site of the circuit and a distal end mounted on a second bonding site of the circuit, and a second PZT actuator having a proximal end mounted on a third bonding site of the circuit and a distal end mounted on a fourth bonding site of the circuit. The first and third bonding sites do not overlap with and are not directly supported by the base portion. The second and fourth bonding sites overlap with and are directly supported by the tongue.

Other objects and features of the present disclosure will become apparent by a review of the specification, claims and appended figures.

DETAILED DESCRIPTION OF THE INVENTION

Figures 1, 2, 3:
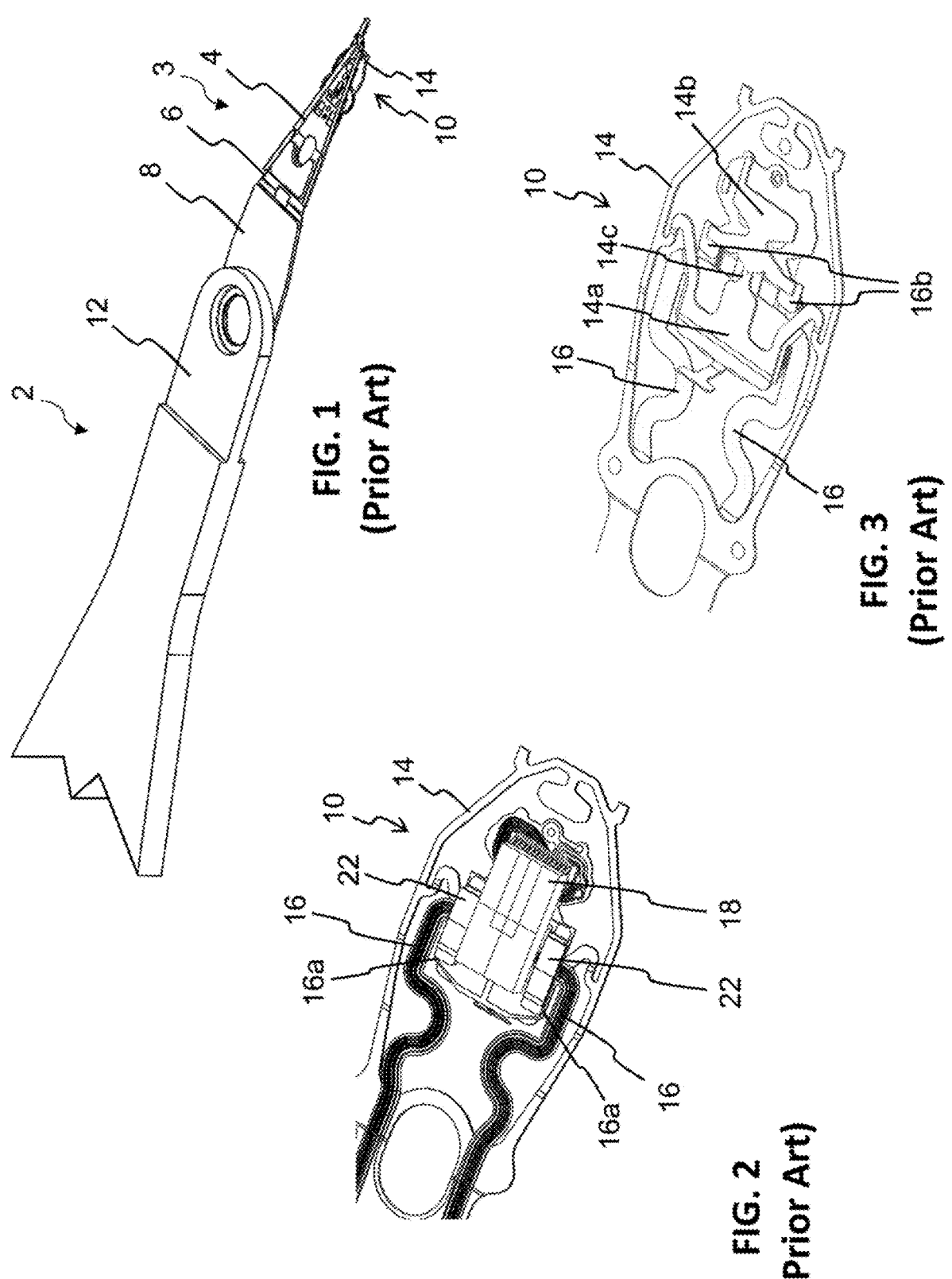
FIG. 1 is a partial perspective view of a conventional head suspension assembly.
FIG. 2 is a bottom view of a conventional head gimbal assembly.
FIG. 3 is a top view of a conventional head gimbal assembly.

It has been discovered that, contrary to conventional thinking, making the base portion of the gimbal less rigid, and making the gimbal's tongue more rigid, make the gimbal more compatible with short electrode PZT's. Such a gimbal can be used with the head stack assembly 2 shown in FIG. 1.

Figures 6, 7:
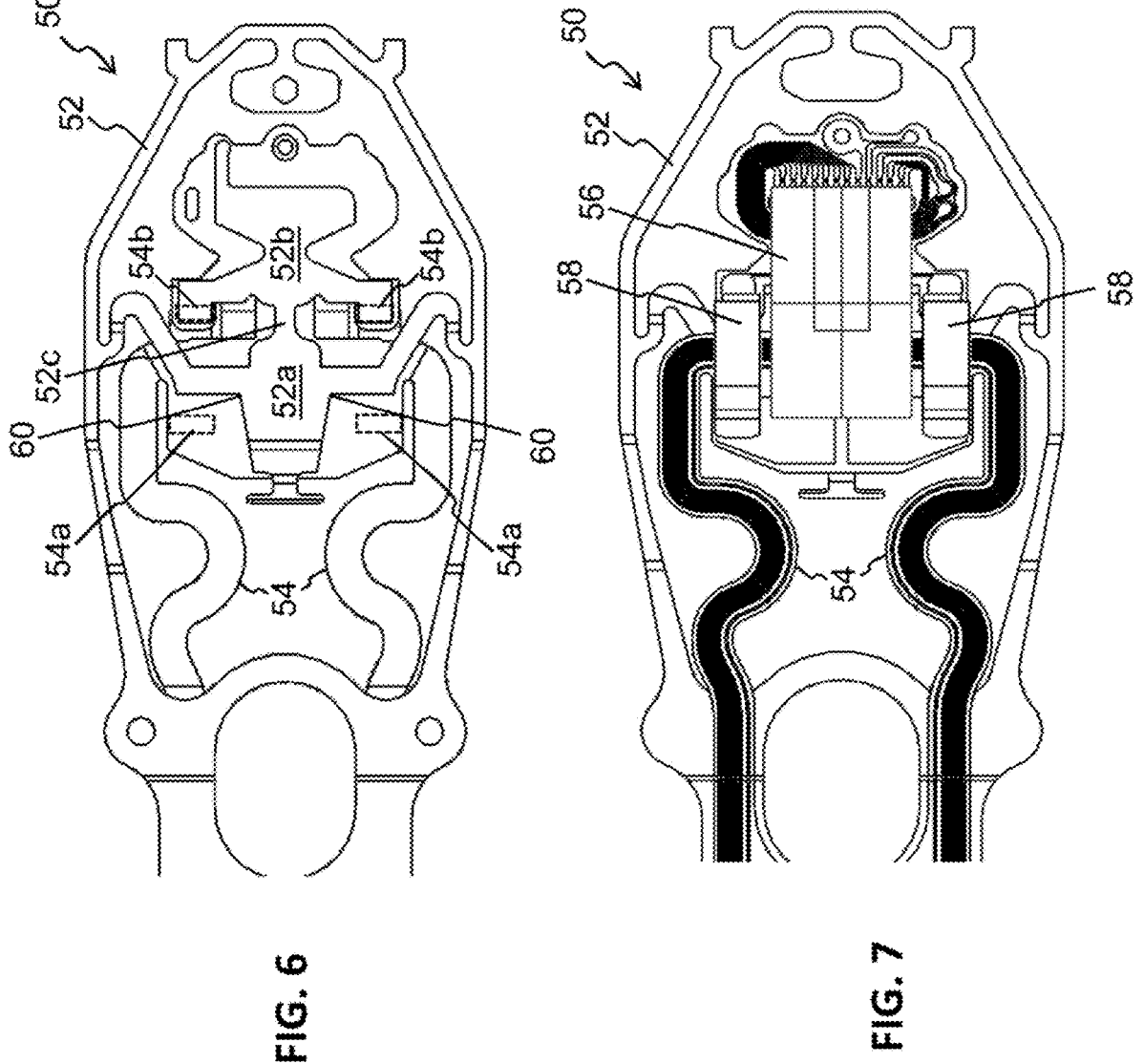
FIG. 6 is a bottom view of an example of a head gimbal assembly.
FIG. 7 is a top view of the example of a head gimbal assembly.

FIGS. 6 and 7 illustrate top and bottom views, respectively, of a head gimbal assembly 50 according to one example, which is compatible with the head stack assembly 2 and suspension assembly 3 discussed above (i.e., the head gimbal assembly 50 can be mounted on the load beam 4 discussed above with respect to FIG. 1). Head gimbal assembly 50 includes a gimbal 52, forming thin components of sheet metal. The gimbal 52 may be formed of stainless steel. A circuit 54 is mounted or otherwise attached to the gimbal 52, and includes conductive traces and insulation material. The conductive traces can be copper, and the insulation material can be polyimide. A slider 56 is mounted on the gimbal 52, and includes a read/write head. The slider can be mounted on the gimbal 52 by an adhesive.

The gimbal 52 includes a base portion 52*a* and a tongue 52*b*, which are joined together by a neck portion 52*c*. The slider 56 is mounted on the tongue 52*b* (either directly, or indirectly where the slider 56 is directly mounted on the circuit 54 and the circuit 54 is directly mounted on the tongue 52*b*, or both). The tongue 52*b* is configured to rotate or otherwise be displaced relative to the base portion 52*a* about the neck portion 52*c*, in order to provide relatively small movements of the slider 56 for fine position control of the slider 56 during operation. PZT actuators 58 are mounted between the tongue 52*b* and the base portion 52*a*, for rotating or otherwise displacing the tongue 52*b* (and the slider 56 mounted thereto) relative to the base portion 52*a* about the neck portion 52*c* when the PZT actuators 58 expand and contract in response to electrical signals provided by the circuit 54 (for providing fine positioning control of the slider 56 relative to the disk tracks during operation).

The circuit 54, slider 56 and PZT actuators 58 are all mounted on the same side (i.e., a first side) of the gimbal 52, which has the advantage of a simpler manufacturing process since the gimbal 52 need not be flipped over during manufacturing before welding the gimbal 52 onto the load beam 4. In this example, the PZT actuators 58 are indirectly mounted on the gimbal 52, meaning that the PZT actuators 58 are mounted on the circuit 54, which is in turn mounted on the gimbal 52. Circuit 54 extends along and is mounted on the gimbal 52, for conveying electrical signals from the read/write head of the slider 56, and conveying electrical signals to the PZT actuators 58 for fine positioning control of the slider 56. Therefore, the circuit 54 is electrically connected to the electrodes of the PZT actuators 58 (for providing signals that cause the PZT actuators to expand and contract) and to the slider 56 (for conveying signals to and from the slider 56 to conduct operations such a reading and writing).

The present inventors have discovered that making the base portion 52*a* less rigid, and the tongue 52*b* more rigid, provides better resonant frequency performance. This is achieved by providing cut-outs 60 in the base portion 52*a*, so that no portion of the base portion 52 is disposed under the bonding sites 54*a* of the circuit 54 to which the proximal ends of the PZT actuators 58 are mounted. Specifically, bonding sites 54*a* are those portions of circuit 54 to which

US 12,586,604 B2

Figure 8:
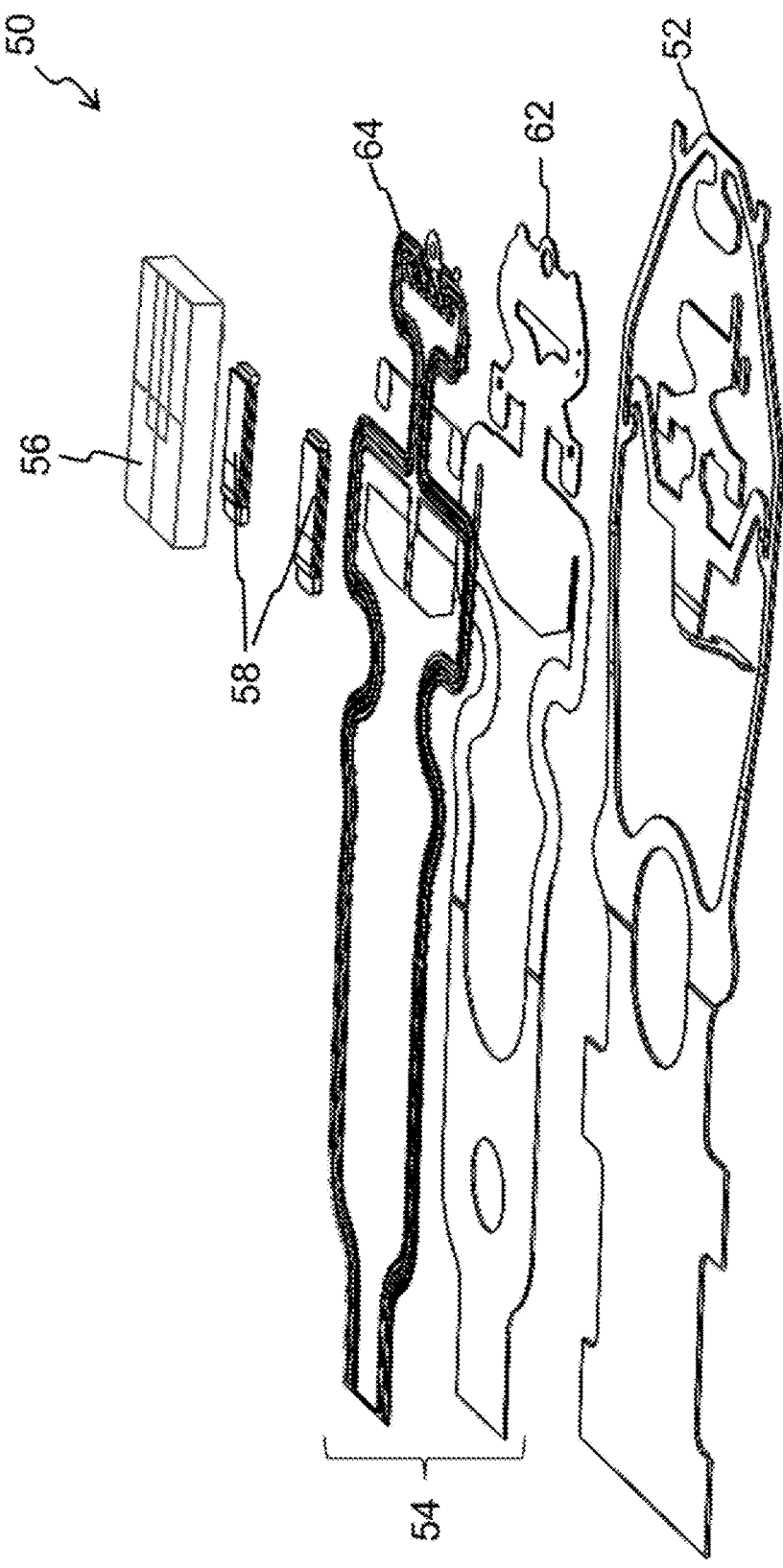
FIG. 8 is an exploded perspective view of the example of a head gimbal assembly.

5 the proximal ends of the PZT actuators 58 are mounted. No portion of the bonding sites 54a overlap with (and directly supported by) base portion 52a (due to cut-outs 60). Instead, the cut-outs 60 result in the bonding sites 54a being laterally adjacent to but spaced apart from the base portion 52a, resulting in the bonding sites 54a having no overlap with, and not directly supported by, the base portion 52a. The bonding sites 54a are only indirectly supported by base portion 52a due to base portion 52a overlapping with and directly supporting other portions of the circuit 54 which are not the bonding sites 54a. FIG. 8 is an exploded view of the head gimbal assembly 50, separately showing the gimbal 52, the insulation 62 of circuit 54, the conductive traces 64 of circuit 54, the PZT actuators 58 and the slider 56.

With this configuration, where the bonding sites 54a are adjacent to but spaced apart from the base portion 52a, because the circuit 54 is more flexible than the gimbal base portion 52a, there is less rigidity between the proximal ends of the PZT actuators 58 and the gimbal base portion 52a, compared to if the gimbal base portion 52a extended underneath and directly supported the bonding sites 54a. This flexibility is achieved by having a portion of the circuit (which is not the bonding sites 54a) overlap with and be directly supported by the base portion of the gimbal. Further, the tongue 52b is disposed under and directly supports the bonding sites 54b of the circuit 54 to which the distal ends of PZT actuators 58 are mounted. Specifically, bonding sites 54b are those portions of circuit 54 to which the distal ends of the PZT actuators 58 are mounted. Bonding sites 54b overlap with and are directly supported by tongue 52b. With this configuration, there is more rigidity between the distal ends of the PZT actuators 58 and the gimbal tongue 52b, compared to if the gimbal tongue 52b did not extend underneath and directly support the bonding sites 54b.

Figure 4:
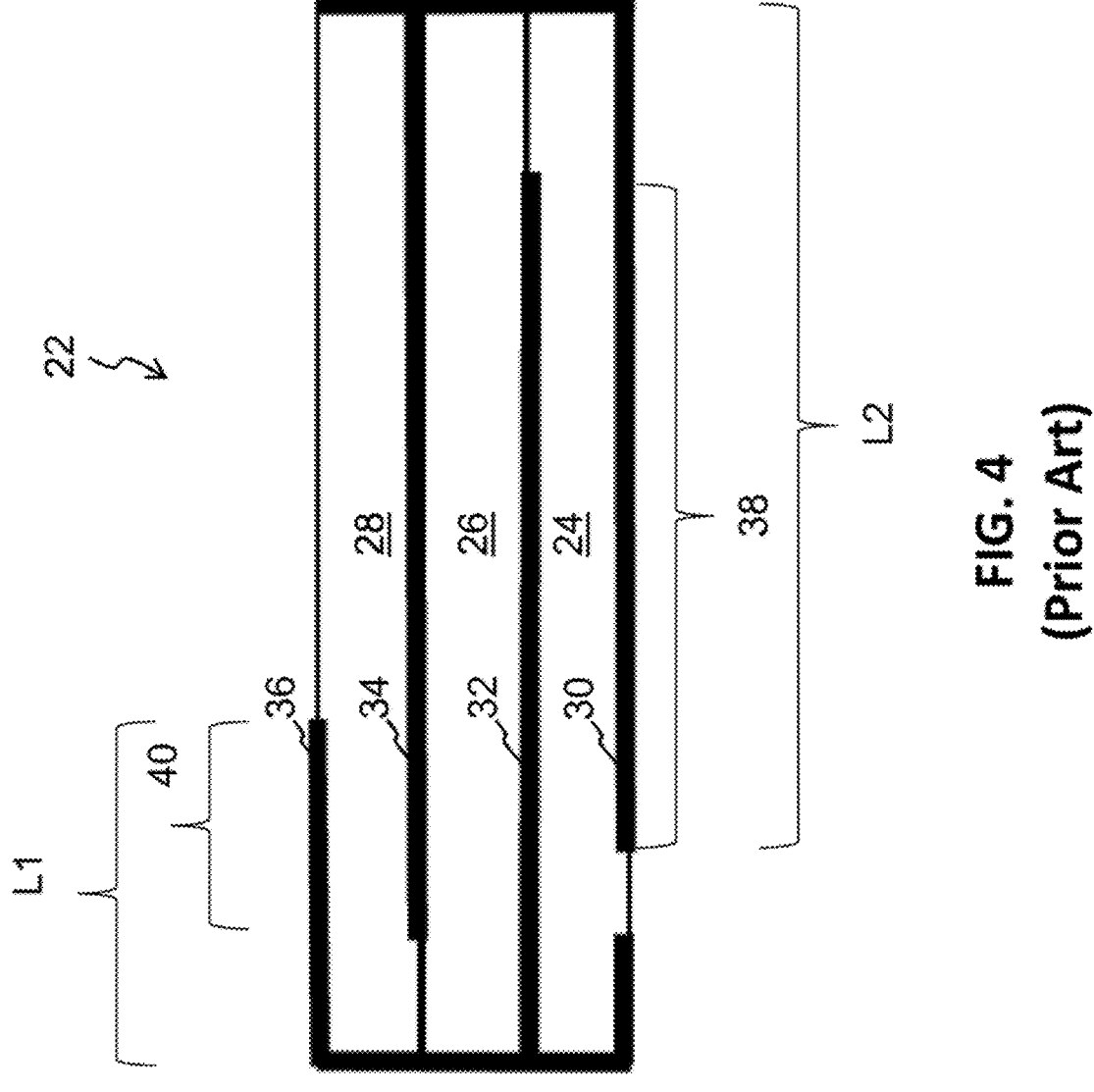
FIG. 4 is a side view of a conventional PZT actuator.
Figure 5:
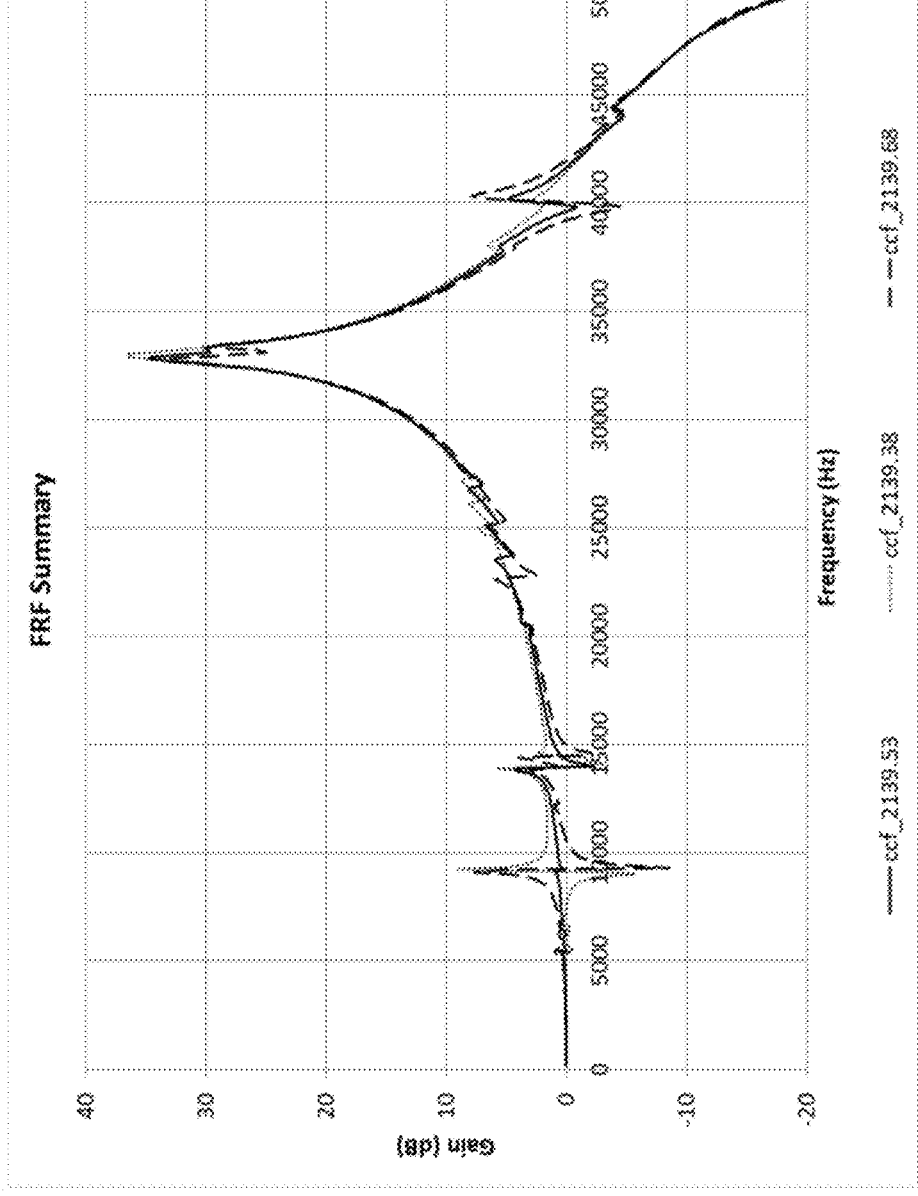
FIG. 5 is a graphical representation of a resonant frequency (FRF) of the suspension assembly, in accordance with the PZT actuators and gimbal of FIGS. 1-4.
Figure 9:
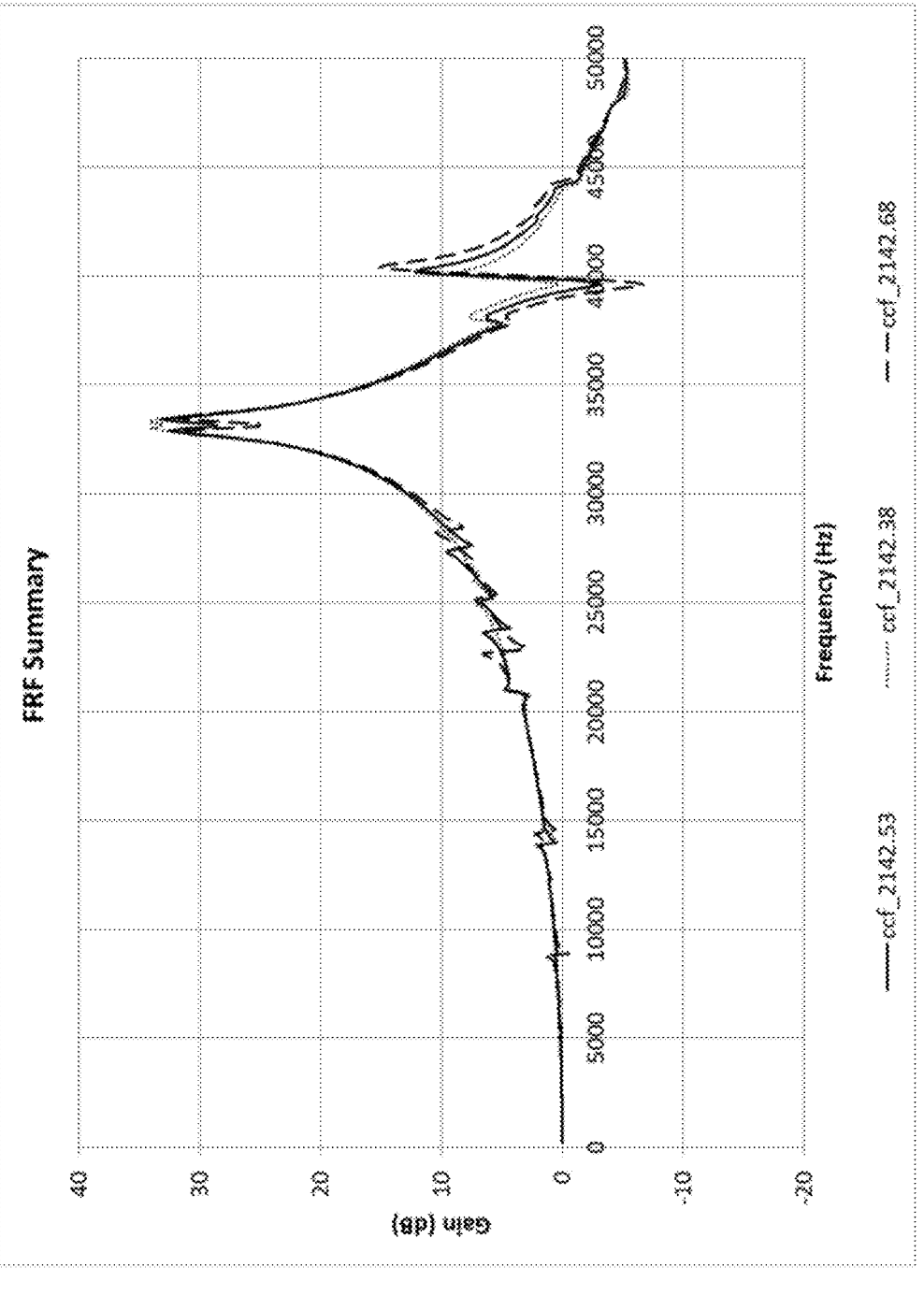
FIG. 9 is a graphical representation of a resonant frequency (FRF) of the suspension assembly, in accordance with the PZT actuators of FIG. 4 and the head gimbal assembly of FIGS. 6-7.

The combination of less rigidity between the PZT actuators 58 and the gimbal base portion 52a, and more rigidity between the PZT actuators 58 and the gimbal tongue 52b, reduces or eliminates the low frequency modes around frequencies of 9000 Hz and 140000 Hz. While the reduced rigidity between the PZT actuators 58 and the gimbal base portion 52a may reduce the level of stroke and therefore stroke performance, increased stroke performance can be achieved to offset this reduction by using the PZT configuration of FIG. 4, namely, a PZT actuator configuration with a reduced upper electrode length. FIG. 9 is a graphical representation of a resonant frequency (FRF) of the suspension assembly with multi-layer PZTs 58, having the electrode configuration of FIG. 4, mounted on the gimbal 52, as shown in FIGS. 6-8. The resonant frequency (FRF) has much cleaner low frequency modes around frequencies of 9000 Hz and 14000 Hz.

It is to be understood that the present disclosure is not limited to the example(s) described above and illustrated herein, but encompasses any and all variations falling within the scope of any claims. For example, references to the present invention, embodiments or examples herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A head gimbal assembly comprising:
   a gimbal having a base portion and a tongue that are joined together by a neck portion;
   a circuit mounted on the gimbal;

6 a slider mounted on the tongue, and electrically connected to the circuit;
a first PZT actuator having a proximal end mounted on a first bonding site of the circuit and a distal end mounted on a second bonding site of the circuit; and
a second PZT actuator having a proximal end mounted on a third bonding site of the circuit and a distal end mounted on a fourth bonding site of the circuit;
wherein the first and third bonding sites do not overlap with and are not directly supported by the base portion, wherein a set of cutouts are formed in the base portion at the first bonding site and the third bonding site to remove a portion of the base portion disposed under the first bonding site and the third bonding site;
wherein the second and fourth bonding sites overlap with and are directly supported by the tongue.

2. The head gimbal assembly of claim 1, wherein:
   wherein a portion of the circuit different from the first and third bonding sites overlaps with and is directly supported by the base portion.

3. The head gimbal assembly of claim 1, wherein the circuit and the slider are mounted on a first side of the gimbal.

4. The head gimbal assembly of claim 1, wherein the each of the first and second PZT actuators comprise:
   a first layer of piezoelectric material;
   a second layer of piezoelectric material disposed over the first layer of piezoelectric material;
   a third layer of piezoelectric material disposed over the second layer of piezoelectric material;
   a first electrode disposed under the first layer of piezoelectric material;
   a second electrode disposed between the first and second layers of piezoelectric material;
   a third electrode disposed between the second and third layers of piezoelectric material; and
   a fourth electrode disposed over the fourth layer of piezoelectric material;
   wherein the fourth electrode has a length that is shorter than lengths of the first, second and third electrodes.

5. The head gimbal assembly of claim 1, wherein the each of the first and second PZT actuators comprise:
   a first layer of piezoelectric material;
   a second layer of piezoelectric material disposed over the first layer of piezoelectric material;
   a third layer of piezoelectric material disposed over the second layer of piezoelectric material;
   a first electrode disposed under the first layer of piezoelectric material;
   a second electrode disposed between the first and second layers of piezoelectric material;
   a third electrode disposed between the second and third layers of piezoelectric material; and
   a fourth electrode disposed over the fourth layer of piezoelectric material;
   wherein the fourth electrode has a length that is shorter than a length of the third electrode.

6. A suspension assembly comprising:
   a baseplate;
   a load beam connected to the baseplate by a hinge;
   a gimbal mounted to the load beam, wherein the gimbal comprises a base portion and a tongue that are joined together by a neck portion;
   a circuit mounted on the gimbal;
   a slider mounted on the tongue, and electrically connected to the circuit;

7 a first PZT actuator having a proximal end mounted on a first bonding site of the circuit and a distal end mounted on a second bonding site of the circuit; and a second PZT actuator having a proximal end mounted on a third bonding site of the circuit and a distal end mounted on a fourth bonding site of the circuit;

wherein the first and third bonding sites do not overlap with and are not directly supported by the base portion, wherein a set of cutouts are formed in the base portion at the first bonding site and the third bonding site to remove a portion of the base portion disposed under the first bonding site and the third bonding site;

wherein the second and fourth bonding sites overlap with and are directly supported by the tongue.

7. The suspension assembly of claim 6, wherein:

wherein a portion of the circuit different from the first and third bonding sites overlaps with and is directly supported by the base portion.

8. The suspension assembly of claim 6, wherein the circuit and the slider are mounted on a first side of the gimbal.

9. The suspension assembly of claim 6, wherein the each of the first and second PZT actuators comprise:

a first layer of piezoelectric material;

a second layer of piezoelectric material disposed over the first layer of piezoelectric material;

a third layer of piezoelectric material disposed over the second layer of piezoelectric material;

a first electrode disposed under the first layer of piezoelectric material;

a second electrode disposed between the first and second layers of piezoelectric material;

a third electrode disposed between the second and third layers of piezoelectric material; and a fourth electrode disposed over the fourth layer of piezoelectric material;

wherein the fourth electrode has a length that is shorter than lengths of the first, second and third electrodes.

10. The suspension assembly of claim 6, wherein the each of the first and second PZT actuators comprise:

a first layer of piezoelectric material;

a second layer of piezoelectric material disposed over the first layer of piezoelectric material;

a third layer of piezoelectric material disposed over the second layer of piezoelectric material;

a first electrode disposed under the first layer of piezoelectric material;

a second electrode disposed between the first and second layers of piezoelectric material;

a third electrode disposed between the second and third layers of piezoelectric material; and

a fourth electrode disposed over the fourth layer of piezoelectric material;

wherein the fourth electrode has a length that is shorter than a length of the third electrode.

11. A head gimbal assembly comprising:

a gimbal having a base portion and a tongue that are joined together by a neck portion, and being configured to receive a circuit;

the tongue being configured to receive a slider and the slider being electrically connected the circuit;

a first PZT actuator having a proximal end mounted on a first bonding site of the circuit and a distal end mounted on a second bonding site of the circuit; and a second PZT actuator having a proximal end mounted on a third bonding site of the circuit and a distal end mounted on a fourth bonding site of the circuit;

wherein the first and third bonding sites do not overlap with and are not directly supported by the base portion, wherein a set of cutouts are formed in the base portion at the first bonding site and the third bonding site to remove a portion of the base portion disposed under the first bonding site and the third bonding site;

wherein the second and fourth bonding sites overlap with and are directly supported by the tongue.

12. A suspension assembly comprising:

a baseplate;

a load beam connected to the baseplate by a hinge;

a gimbal mounted to the load beam, wherein the gimbal comprises a base portion and a tongue that are joined together by a neck portion, and being configured to receive a circuit;

the tongue being configured to receive a slider and the slider being electrically connected the circuit;

a first PZT actuator having a proximal end mounted on a first bonding site of the circuit and a distal end mounted on a second bonding site of the circuit; and a second PZT actuator having a proximal end mounted on a third bonding site of the circuit and a distal end mounted on a fourth bonding site of the circuit;

wherein the first and third bonding sites do not overlap with and are not directly supported by the base portion, wherein a set of cutouts are formed in the base portion at the first bonding site and the third bonding site to remove a portion of the base portion disposed under the first bonding site and the third bonding site;

wherein the second and fourth bonding sites overlap with and are directly supported by the tongue.

* * * * *